United States Patent

Haider

Patent Number: 6,052,955
Date of Patent: Apr. 25, 2000

[54] VIBRATING FLOOR

[76] Inventor: Eduard Haider, Dechantseeser Strasse 4, D-95704 Pullenreuth, Germany

[21] Appl. No.: 08/894,554

[22] PCT Filed: Feb. 22, 1996

[86] PCT No.: PCT/DE96/00342

§ 371 Date: Mar. 9, 1998

§ 102(e) Date: Mar. 9, 1998

[87] PCT Pub. No.: WO96/25867

PCT Pub. Date: Aug. 29, 1996

[30] Foreign Application Priority Data

Feb. 24, 1995 [DE] Germany ............... 295 03 801 U

[51] Int. Cl.[7] ........................ E04B 1/98; E04H 9/02
[52] U.S. Cl. ................. 52/167.5; 52/480; 248/560; 384/151
[58] Field of Search ................... 52/126.1, 126.5, 52/167.5, 167.8, 480; 248/560, 561, 573, 605, 611, 634; 384/151, 153

[56] References Cited

U.S. PATENT DOCUMENTS

| | | |
|---|---|---|
| 951,028 | 3/1910 | Schär ........................ 52/167.5 |
| 1,640,326 | 8/1927 | Jorvasson et al. . |
| 2,014,643 | 9/1935 | Bakker ..................... 52/167.5 X |
| 3,110,464 | 11/1963 | Baratoff et al. ............ 52/167.8 X |
| 3,794,277 | 2/1974 | Smedley et al. ........... 52/167.8 X |
| 4,517,778 | 5/1985 | Nicolai . |
| 4,718,206 | 1/1988 | Fyfe et al. ..................... 52/167.8 |
| 5,215,382 | 6/1993 | Kemeny .................... 52/167.1 X |

FOREIGN PATENT DOCUMENTS

| | | |
|---|---|---|
| 0 386 202 B1 | 5/1993 | European Pat. Off. . |
| 2 319 667 | 4/1974 | Germany . |
| 31 37 757 C1 | 2/1984 | Germany . |
| 35 06 377 A1 | 8/1985 | Germany . |
| 8531386 | 4/1987 | Germany . |
| WO 86/06597 | 11/1986 | WIPO . |
| WO 90/01886 | 3/1990 | WIPO . |

*Primary Examiner*—Carl D. Friedman
*Assistant Examiner*—Kevin D. Wilkens
*Attorney, Agent, or Firm*—Eric P. Schellin

[57] ABSTRACT

An oscillatory floor surface for standing thereupon. The surface is supported at at least three points each having two circular cups mounted above one another. Each has a spherical depression in confrontation to define a space. A ball is in the space. The cups being affixed to each other by an elastic annular casing. The casing being held to each of the cups by a band.

1 Claim, 3 Drawing Sheets

VIBRATING FLOOR

BACKGROUND OF THE INVENTION

The invention is relative to an oscillatory standing floor.

U.S. Pat. No. 1,640,326 teaches an oscillatory standing floor with an upper part which can move relative to the lower part positioned on the ground or like supporting surface, which upper part and lower part are connected to one another by springs.

DE-U-85 31 386 teaches the suspending of an upper part of a frame on a lower part for receiving a single foot of a chair, armchair, couch or bed via cable rope pendulums of different stages connected functionally in series and with different natural resonant frequencies.

DE patent 31 37 757 teaches an resilient spring floor for gymnasiums which consists of a sub-floor resting on carrier elements and distributing the pressure, on which sub-floor a floor covering is placed. These carrier elements are designed to be permanently resilient and comprise a carrier body which surrounds a hollow space which reduces its vertical clearance upon vertical loading. The lower part of a stop extends into the hollow space which stop can be adjusted in height from the outside, is guided in the carrier element and can be locked opposite the latter at the desired height. This known resilient floor allows a vertical motion but not a horizontal one.

Furthermore, DE-AS 23 19 667 teaches an oscillating dancing surface with at least one plate resiliently supported on a fixed sub-floor, with at least one oscillation generator acting on the plate. An electromechanical converter is fastened to the bottom of the plate as oscillation generator which converter transforms the supplied electric tone frequency output modulated with dancing music into mechanical oscillations. Even this oscillating dancing surface executes only vertical movements. The surface is secured from lateral shifting by its mounting in so-called troughs of steel sheeting or plastic. A layer of plastic or rubber is located between the plates and the sub-construction in order to avoid resonance noises during operation. No horizontal movements are possible with this known oscillating surface nor is the surface excited in natural frequency or oscillations.

Finally, DE patent 0,259,325 teaches a pendulum in which each of its two ends is provided with a clamping head and which comprises distributed over the length of the pendulum with the exception of a short zone in the end areas of the pendulum a plurality of bulging, toroid relatively rigid bodies with only a slight mutual distance from each other arranged like beads. There is no discussion in this patent of the oscillating mounting of a standing floor.

For many people who must carry out their professional activity while standing, e.g. surgeons, dentists or speakers, the long time spent standing in a more or less rigid posture or in positions given by the course of the activity constitutes a considerable strain. There is an urgent desire for a dynamically mounted standing floor.

In addition, there is also a desire in the area of therapy for a dynamically mounted standing floor.

The invention has the problem of creating a reliably functioning standing floor which can oscillate in a horizontal plane.

SUMMARY OF THE INVENTION

It has been noted that people who work on an oscillatory standing floor are considerably less stressed and have a lesser tendency to become tired or develop back pains, obviously due to of the dynamic components of the standing floor. It is of course extremely important that the dynamic component of the standing floor is properly dimensioned. If the dynamic component is too small the desired dynamic properties obviously occur only to a slight extent; on the other hand, if the dynamic component is too great the user has the feeling of standing on a "swaying floor". The dynamic component must therefore be selected in such a manner that the ability to work is not negatively influenced in any way.

BRIEF DESCRIPTION OF THE DRAWINGS

The invention is explained in the following with reference made to the drawings.

DETAILED DESCRIPTION OF THE INVENTION

Figure 1:
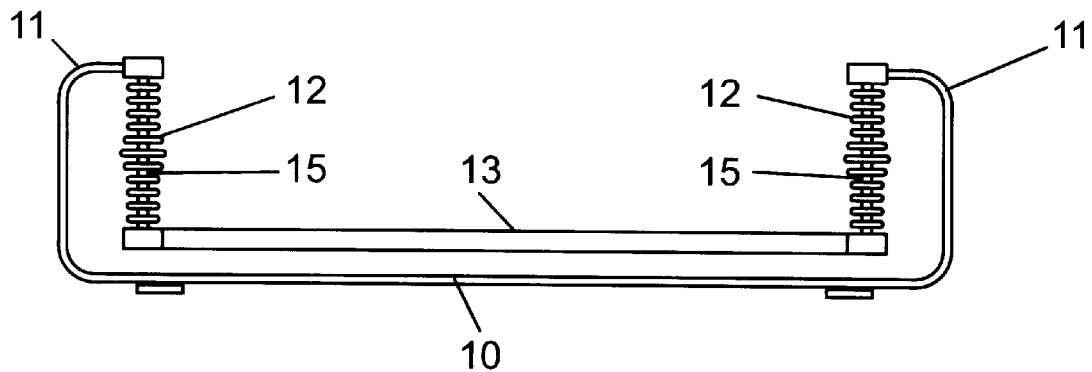
FIG. 1 shows a standing floor suspended within a carrier frame on pendulums.

The standing floor can be mounted in various ways so that it can oscillate. FIG. 1 shows a carrier frame 10 with at least three essentially curved bracket-shaped carrier brackets 11 which hold horizontally standing floor 13 via pendulums 12 in such a manner that it can oscillate essentially in a horizontal plane and is thus capable of lateral movements. Naturally, slight vertical motion components also result during the oscillating or swinging motion.

The fact is significant that pendulums 12 do on the one hand make an oscillating motion possible but on the other hand also assure a certain damping, since the motion of deflection must obviously not exceed a certain extent. Otherwise, the user of the standing floor would lose a feeling of safety when standing thereon. Pendulums according to EP patent 0,259,325 have proven to be especially advantageous.

A plurality of relatively rigid bead-like bodies 15 are advantageously arranged in a series over the length of pendulum 12 which are arranged with only a slight interval from each other like beads over almost the entire length of the pendulum. Looping movements of pendulum 12 during transport or in the case of similar actions are reliably avoided by these bead-like bodies with only a slight interval from each other. The diameter of the relatively rigid bead-like bodies arranged like beads can increase from the end areas of pendulum 12 toward the middle. A relatively short zone in the vicinity of the clamping heads remains free of bead-like bodies 15 in order to assure a trouble-free suspension on the clamping heads and therewith an unobjectionable functioning of the pendulum. The intermediate spaces between individual bead-like bodies 15 arranged like beads can be largely filled up with an elastic material which also surrounds, if necessary, said bodies. The behavior of pendulum 12 can be influenced by the strength or thickness of the elastic covering applied. A reinforcement of this layer elevates the damping properties. A pendulum 12 corresponding exactly to the particular requirements can be created by a plurality of graduations, which pendulum then only has to be selected and suspended. Further details can be seen from EP patent 0,259,325.

Figure 2:
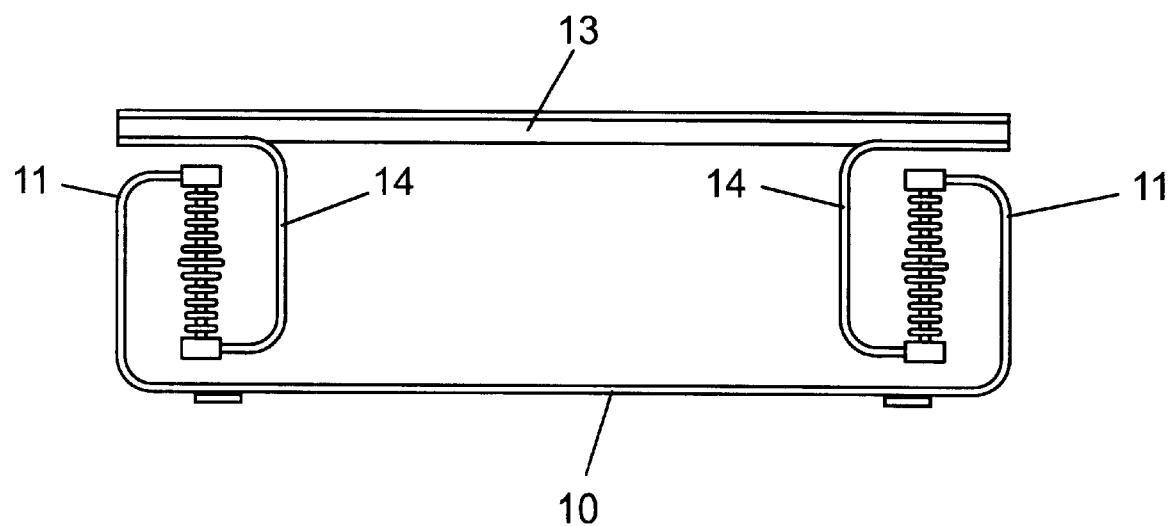
FIG. 2 shows a standing floor on the bottom of which support arches are arranged which are suspended for their part via pendulums on the carrier frame arranged below the standing floor.

FIG. 2 shows a similar design of a standing floor 13 in which, however, receiving supports 14 are arranged on its underside essentially axially symmetric to carrier support 11. These receiving supports 14 engage the lower end of pendulum 12. This construction brings it about that a surface is created in the plane of standing floor 13 which surface is free of interfering hindrances such as those posed e.g. by carrier supports 11 in FIG. 1.

Figure 3:
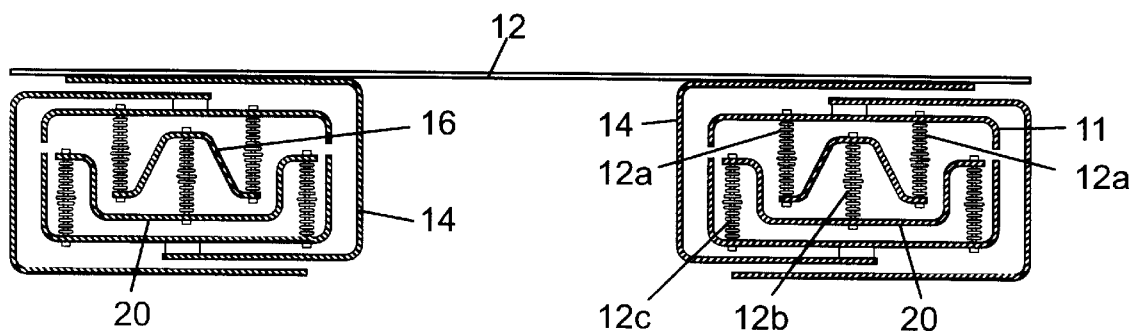
FIG. 3 shows a variant of the embodiment of FIG. 2 with a multistage pendulum system.

FIG. 3 shows a standing floor 13 which agrees largely with FIG. 2; however, it comprises a multistage pendulum suspension. Several pendulums 12a are suspended on carrier supports 11 of carrier frame 10 on which pendulums intermediate plane 20 is held which for its part carries a further pendulum 12b via carrier structure 16 which pendulum 12b holds support arm 14 of standing floor 13. According to FIG. 4 a first carrier element 11a supported on the floor has essentially the shape of a U resting on its side and carries carrier arch 11b suspended in its upper shank which arch carries for its part at least three pendulums 12a which for their part hold an essentially bell-shaped intermediate carrier 16. Cup-shaped intermediate carrier 16a is supported on this bell-shaped intermediate carrier 16 via at least one pendulum 12b which carrier 16a carries another cup-shaped element 16b via at least three pendulums 12c of a third stage. This element 16b also forms, among other things, the upper plane of the entire body via a carrier body designed essentially in the shape of a reclining U. Standing floor 13 is arranged on this upper plane either directly or under interpositioning of yet additional elements.

In such an instance the total behavior of standing floor 13 is determined by differing behavior of the particular cable or rope pendulums, e.g. different lengths, different damping, etc. The action of one or the other groups of pendulums can be cut out by known blocking mechanisms. The user then has the choice of the behavior of the one or of the other pendulum group.

Figure 4:
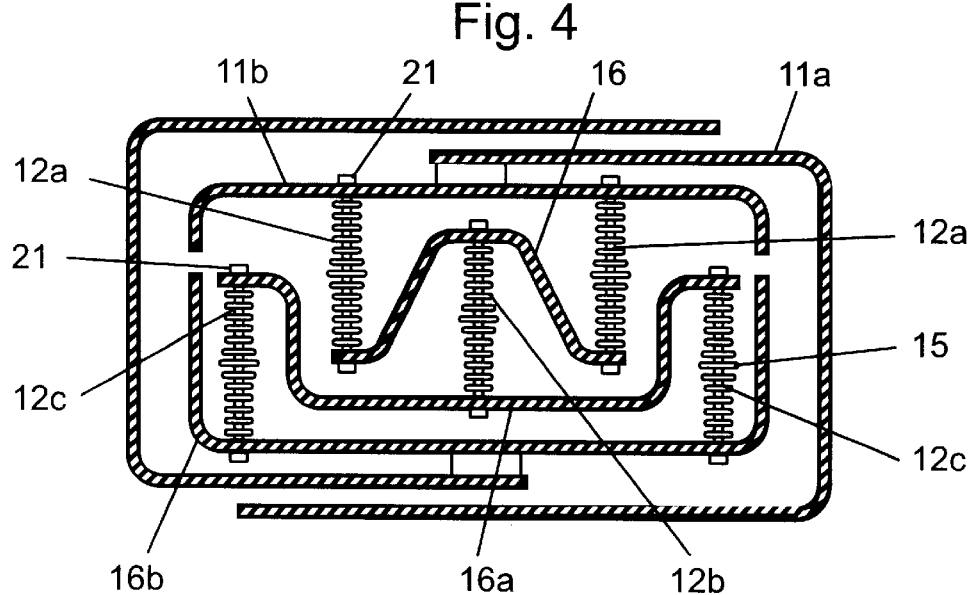
FIG. 4 shows a detailed view of FIG. 3 in which even a certain oblique position of the pendulum can be set if needed.

There is also the possibility, as FIG. 4 shows, of varying receiving points 21 for pendulums 12 in a radial direction. The effects resulting from such a measure are described in detail in EP patent 0,386,202. A shifting of the receiving points for pendulums 12 can adjust the latter in such a manner that they form a trapezoid open at the top or tapering upward. Thus, there is a continuous possibility of adjusting the arrangement formed by pendulums 12 and the bridges and therewith a continuous influencing of the oscillatory behavior. The user has the possibility therewith of adapting the oscillatory behavior to his particular desires and requirements in a correspondingly continuous manner. In the case of a parallel setting of pendulums 12 a normal oscillatory behavior results, and, an oscillatory behavior deviating from the normal case will occur as a function of the deviation from the parallel position of pendulums 12 in the one direction or the other.

Figure 5:
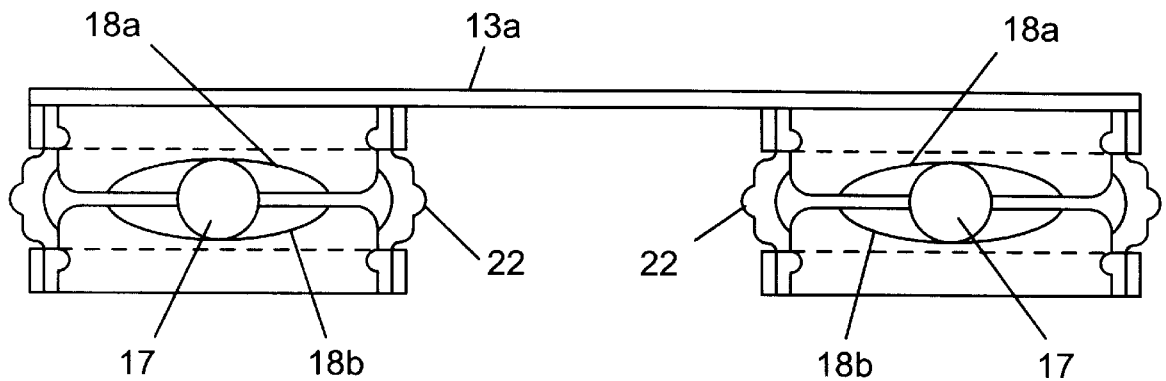
FIG. 5 shows a standing floor in which the oscillating mounting takes place via a sphere within two associated cup-shaped receiving shells.
Figure 6:
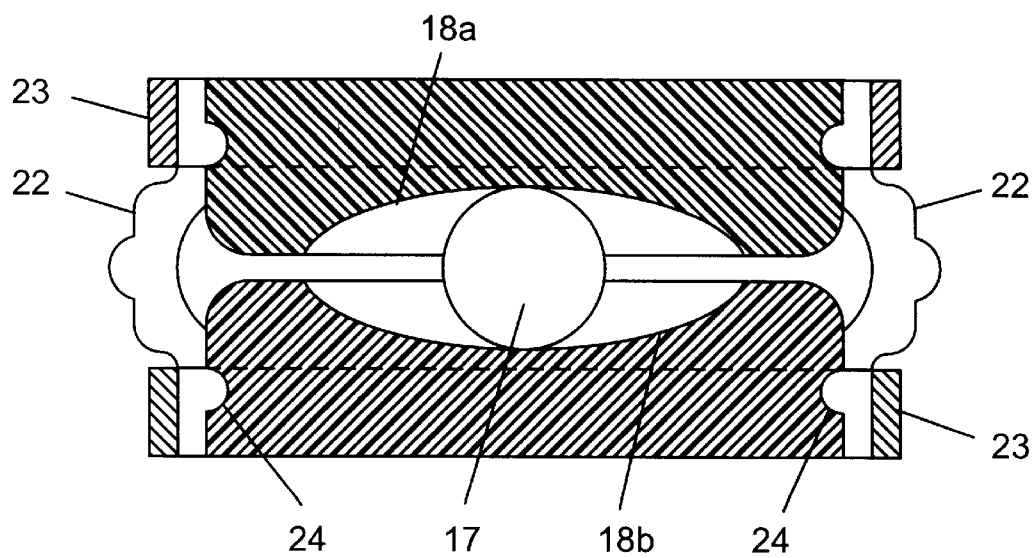
FIG. 6 shows a detailed view of the mounting according to FIG. 5.

FIG. 5 shows another variant in which the oscillating motion is brought about by two spherical cups 18a, 18b with a large radius of curvature arranged in a mirror-inverted manner relative to one another between which sphere or ball 17 is located. The surfaces of spherical cups 18a, 18b are preferably hardened and likewise for the surface of sphere 17. A casing 22 sealing the inner area with sphere 17 in a dust-proof manner is provided between upper spherical cup 18a and lower spherical cup 18b which casing consists of elastic material and at the same time exerts a certain damping action of the lateral oscillating motions. Casing 22 is provided in its end areas with an inner bead or which fits into corresponding groove 24 of the outer circumference of spherical cups 18a, 18b and is fixed in this position via clamping ring 23 in such a manner that only a slight rotation of casing 22, conditioned by the elasticity, is possible but no lasting relative motion between the bead and spherical cups 18a, 18b.

In the case of any lateral deflections upper spherical cup 18a shifts relative to lower spherical cup 18b with the participation of sphere 17. As a result thereof, sphere 17 is shifted out of the low position in spherical cup 18b into a higher position and then oscillates into the low position again and then past the low position into a high position on the other side. This results in the lateral oscillatory motions. For the rest, that which has already been said for the exemplary embodiments according to FIGS. 1 to 4 is valid.

The described standing floor is also suitable for therapeutic treatments of an "unstable" knee or of an "unstable" ankle joint.

In addition, the standing floor has proven to be therapeutically effective for

Constitutional or local hypermobilities in the postural system,
Functional deviations of the spinal column at any age,
Idiopathic scolioses,
So-called juvenile hunchbacks,
Scoliosizations of the spinal column, especially in children and adolescents,
So-called postural weaknesses,
Projecting shoulder-blades [scapilae],
Disturbances of the plantar arches, especially in children,
Incomplete, limp paralyses in the postural system,
Polyneuropathies in which disturbances of the proprioceptive afference predominate (not suitable if there are relevant disturbances of the rising pathways in the spinal marrow),
Disturbances of proprioceptive afference, organically or functionally conditioned.

If the standing floor is used like this in therapy, it is additionally provided with a support railing in order to give a patient a better grip.

The operation is basically assured by at least three pendulums 12 in one embodiment and three pairs of spherical cups 18a, 18b in the second embodiment. However, more such elements can be provided as needed. The pairs of spherical cups 18a, 8b can be operated functionally in series. To this end, e.g. several stages are arranged in a superposed manner from which each individual one can be put out of operation as needed. This means as a result that the individual pairs of spherical cups 18a, 18b of the one stage or of the other stage can be cut out by blocking mechanisms so that the one or the other stage alone or also several stages together can enter into operation. Since the oscillating behavior, especially the frequency, depends on the shaping of the particular spherical cups 18a, 18b, it is possible to achieve in this manner that a blocking of the one stage or of the other stage permits only quite specific given frequencies to act. The user can thus select the optimum natural frequencies corresponding to one's particular individual requirements, within a certain framework.

It is contemplated that the surface of standing floor 13, 13a may be rectangular, square, round or also some other shape.

What is claimed is:

1. An oscillating standing floor with an upper part movable relative to a lower part positioned on a conventional floor, said upper part and said lower part are operatively connected to one another by a plurality of members, said members each comprising a horizontal first circular cup, said first cup having a downwardly facing first spherical depression, a horizontal second circular cup, said second cup having an upwardly facing second spherical depression, said first spherical depression and said second spherical depression being in confrontational relationship and defining a space therebetween, a ball positioned in said space, said ball having a diameter to maintain said first circular cup and said second circular cup in a non-touching relationship, said first circular cup and said second circular cup each having an annular radially extending peripheral groove, an elastic annular casing, said elastic annular casing having spaced radially inwardly extending annular projections adapted and constructed to fit into said grooves thereby to seal said space containing said ball, an annular band mounted externally about said annular casing opposite to said projections whereby to retain the casing about said cups.

* * * * *